Dec. 9, 1958 G. C. PRÜSSING ET AL 2,863,225
APPARATUS FOR THE PREHEATING OF POWDERED MATERIAL
PARTICULARLY CEMENT RAW MIX
Filed Jan. 15, 1957 2 Sheets-Sheet 2
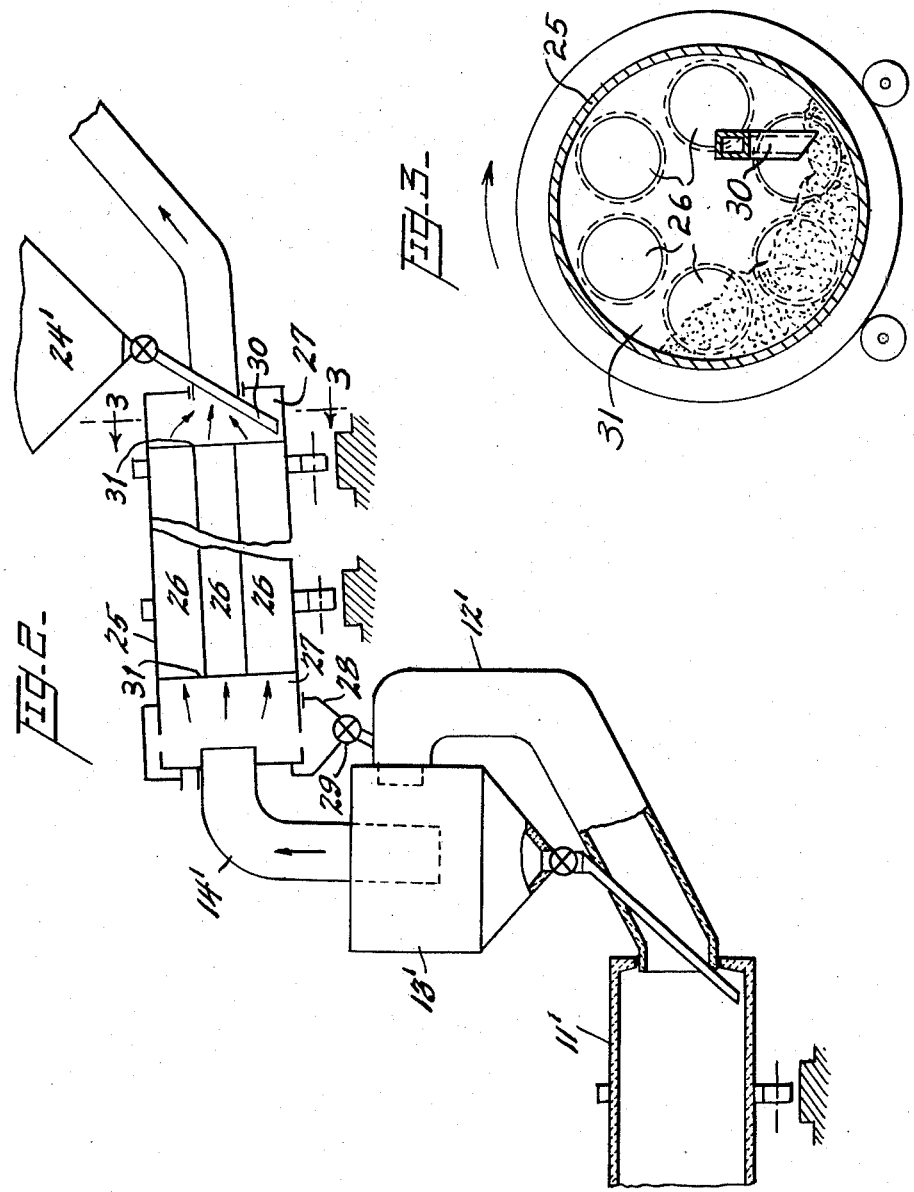
INVENTORS
Georg C. Prüssing
Bernd H. Helming,
BY Watson, Cole, Grindle
& Watson ATTORNEYS

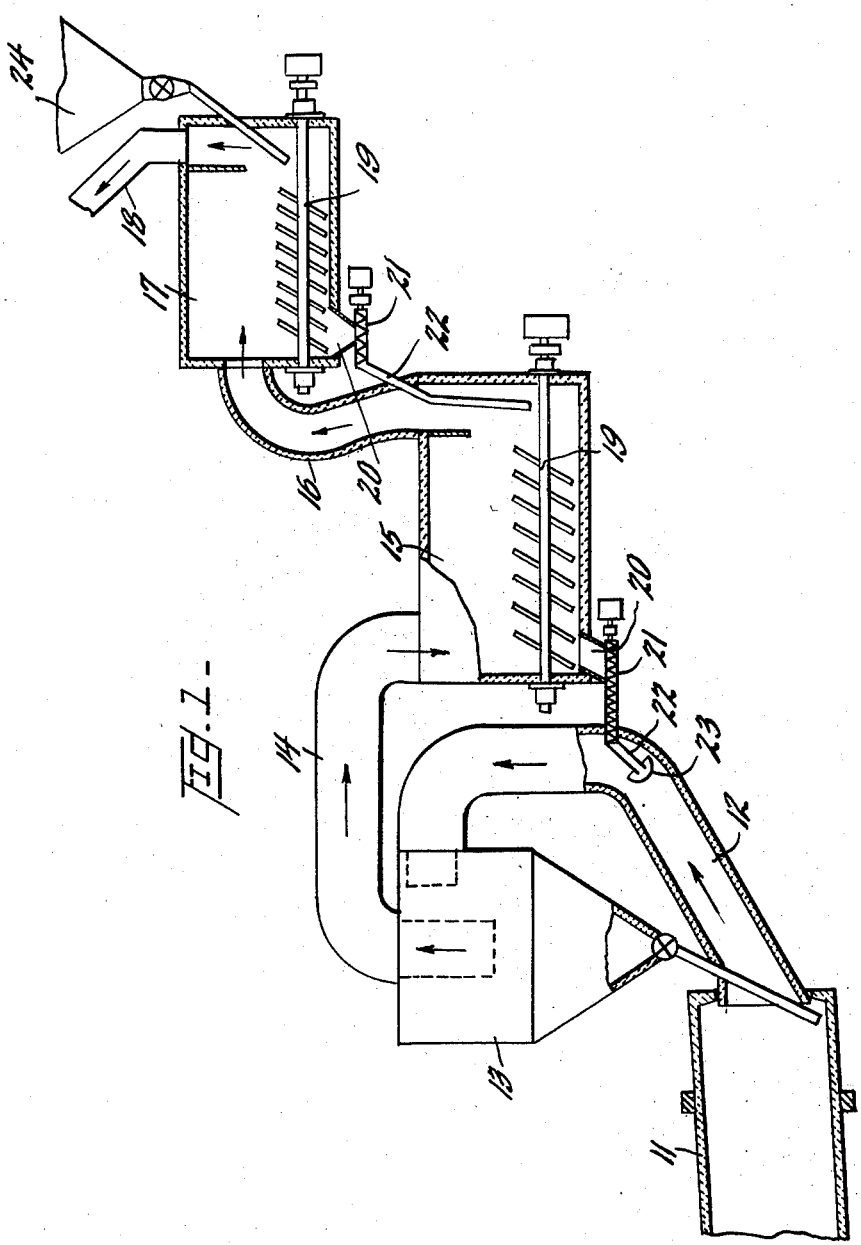

United States Patent Office 2,863,225
Patented Dec. 9, 1958

2,863,225

APPARATUS FOR THE PREHEATING OF POWDERED MATERIAL PARTICULARLY CEMENT RAW MIX

Georg Curt Prüssing, Beckum, and Bernd Hermann Helming, Neubeckum, Germany

Application January 15, 1957, Serial No. 634,336

4 Claims. (Cl. 34—68)

The present invention relates to the art of heating pulverized raw material and is particularly concerned with the problem of preheating the pulverized material by the heat of the waste gases of the furnace. There have been suggested a number of ways of preheating material, which is to be charged into a furnace, by utilizing the waste gases from the furnace. It has been attempted, for instance, in connection with rotary kilns used for burning cement, wherein the raw cement mix is charged in dry form at the inlet end, to transmit a substantial portion of the heat of the waste gases to the raw mix by inserts provided in the preheating portion of the kiln. For this purpose, there were used rotating disks which, being contacted by the waste gases, became hot, and gave off heat to the raw mix during their next immersion into same. Furthermore, lifting devices have been installed in the preheater portion of the kiln for continuously throwing the material up into the gas stream. There have also been proposed cellular inserts which divide up the stream of material and are claimed to improve the heat transfer. Such inserts in the inlet end of a rotary kiln are subject, however, to extreme thermal stresses in the hot part of the kiln, so that even when constructed of expensive heat-resistant materials the inserts are destroyed after some time; consequently, their use is not economical. Accordingly, such inserts in rotary kilns have not gained acceptance. Another proposal has been to shorten the rotary kiln and use it only for aftertreatment, sintering, calcining, etc., while the preheating is effected outside of the kiln.

Recently, cyclones have been employed to effect the preheating in a plurality of stages arranged one above the other. In this arrangement, the dry, powdery material is charged into the uppermost cyclone stage, discharged from same and conducted into the gas line of the next stage and so on, down to the lowermost stage from which the preheated material is introduced into the kiln. Stepwise preheating by cyclones has the disadvantage that the heat transfer in each stage takes place with parallel flow and therefore is not sufficiently intensive. As a result of this, the temperature of the waste gas, even in the case of a four-stage cyclone preheater, is still undesirably high so that considerable quantities of heat are lost without having been utilized. In addition to this, the waste gas blower must overcome the resistance of a plurality of cyclones so that the power consumption for the operation of the waste gas blower is very high. The recovery of heat, which is obtained by means of the cyclone preheater, is thus counteracted at least by the increased consumption of electrical power as compared with other methods. Another disadvantage results from the fact that due to the cyclone action, the finest particles of the dry powdered charge material are not separated in the individual stages but pass through all the cyclones and are discharged to the atmosphere together with the flue gases. Even with the addition of high grade dust precipitators, the removal of the dust from the waste gases leaves much to be desired due to the fineness of the dust to be removed.

The elimination of these disadvantages is the principal object of the present invention.

In accordance with the invention, the preheating of the powdered material is also effected in stages. In the stage wherein the hottest temperature exists, the powdered material is in parallel flow, heat exchange relationship in a cyclone with high velocity waste gases from the rotary kiln. With this arrangement, flue gases, which come into contact with the material with a velocity of about 10 to 20 meters per second, undergo a drop in temperature from about 1000° C. to 600–700° C. Upstream of the cyclone in the material flow path, there is provided a preheating stage in which the material is contacted by flue gases having a low velocity of about 0.3 to 3 meters per second. This preheating stage consists of a large-volume chamber in which the powdered material during its passage therethrough is repeatedly thrown into the stream of fluid gas by known pneumatic or mechanical means and is in countercurrent or transverse flow with the gas stream. The temperature of the flue gases in this stage is reduced a further 200 to 300° C. In another preheating stage, which may be similar or identical to the last-mentioned preheating stage, further preheating, also in countercurrent or transverse current, takes place in which the heat transfer is so intensive that the flue gases give up practically all their heat to the furnace charge so that the dust content of the waste gases corresponds to normal particle size and can be removed from the gases by means of known high-capacity dust precipitating systems down to a residual content which is within permissible limits set forth in local regulatory codes. A suitable large-volume preheater can take the form of a cylindrical hollow body which turns slowly on rollers in a manner similar to the rotary kiln. This drum can be provided with cells, tubes or lift members so that by means of these inserts the powdered material comes into most intimate contact with the flue gases which flow countercurrent to the material and in this way an intensive heat exchange takes plate. Since the cyclone protects the preheater upstream from it from excessive temperatures, the devices installed in the drum, i. e., tubes, cells, etc., are not exposed to excessive thermal stress and are therefore not subject to destruction. As the flue gases enter the earliest countercurrent or transverse current preheater at a very low temperature, there can be readily used for the inserts cheap materials which nevertheless have a long life at these temperatures.

The basic concept of the present invention therefore is a multi-stage preheater having a high temperature stage in which heat exchange takes place with high velocity flue-gas in a cyclone, and one or more low temperature stages in which it takes place with low velocity flue-gas in large-volume chambers of known design.

Two embodiments for the carrying out of the method are shown schematically in the drawings in which:

Fig. 1 shows a system having two large-volume preheating stages; and

Fig. 2 shows a system wherein the large-volume preheating stage is constituted by a rotary drum.

Fig. 3 is a vertical cross-section taken along line 3—3 in Fig. 2 with the material being treated indicated by stippling.

In Fig. 1, the number 11 designates the inlet end of a rotary kiln constructed and supported in a known manner. Into the end of kiln 11, there extends the end of a steeply rising insulated pipeline 12, which leads to the cyclone 13, which is provided with insulated walls and an outlet pipe extending down to the floor of the kiln. A duct 14 connects the interior of the cyclone with a large-volume preheater chamber 15 which is, in turn, connected by a duct 16 with a second large-volume preheater chamber 17 located above the former. Preheater 17 opens into a stack 18 which leads to a dust precipitation unit, not shown.

The large-volume preheaters 15 and 17 are each provided with a high-speed agitating device 19 of known type which throws the powdered material continuously into the stream of flue gas passing through the chambers. At the front ends of each of the preheater chambers 15 and 17, there are provided separate outlets 20 discharging into worms 21 disposed below the chambers, and the outlet ends 22 of worms 21 discharge into preheater chambers 15 and into pipeline 12, respectively. There is provided in front of the mouth of the discharge pipe 22 in line 12 a semi-spherical baffle or shield 23, which serves to prevent the entrance of hot gases into the worm 21. The raw material is charged into chamber 17 from a hopper 24. Instead of the two preheaters 15 and 17, there may also be used a single preheater of appropriately enlarged dimensions.

In the installation shown in Fig. 2, the stationary preheater chambers of Fig. 1 are replaced by an inclined, rotary drum 25 having a plurality of pipes 26 located alongside of each other in the interior thereof and supported at their ends by transverse plates 31. At both the inlet and outlet end of the drum 25, there is a separate chamber 27 communicating with all of the pipes 26, the chamber located at the inlet end of pipes functioning to spread the material introduced from the hopper 24 into the collector 27 via conduit 30 into the individual pipes 26. A chute 28, connected at the outlet end of the drum and provided with a rotary gate 29, conducts the material into the flue-gas line 12, from whence it passes into the cyclone 13'.

The operation of the apparatus of this invention may be described as follows:

The flue gases leave the kiln 11, being used for calcining or sintering, at a temperature of about 1000° C. They pass through the rapidly rising pipeline 12 into the cyclone 13, entraining the pulverulent material emerging from the pipe 22. In this connection, the flue gases give off a part of their heat to the material which slides through the discharge pipe of the cyclone onto the bottom of the kiln. The waste gases enter the first preheater 15 with a temperature of between 600 and 700° C. and are brought there in intimate contact in countercurrent or cross-current flow with the material present in this chamber by the agitator 19, due to which the gases give off a considerable part of their heat content. The flue gases then pass at a temperature of between 200 and 300° C. through the pipe 16 into the second, higher preheater 17 in which a further portion of their heat is removed from the gases in the same manner as in the first preheater. The flue-gases pass from the second preheater through pipe 18 into the dust precipitating system and from there into the atmosphere.

The system shown in Fig. 2 operates in the same manner as that shown in Fig. 1; in other words, the flue-gases emerge from the rotary kiln 11' through the pipeline 12' provided with refractory masonry insulation into the cyclone 13', and undergo a sharp drop in temperature by contact with the dust introduced through the chute 28. The pulverulent material which is separated in this connection passes through the outlet pipe of the cyclone onto the bottom of the kiln. The flue gases are conducted through pipe 14' into the tubular or drum preheater 25 in which they are intimately mixed with the material and give off a part of their heat to it. The material being treated, showing in stippling in Fig. 3, collects in the chamber 27 at the inlet end of tubes 26 and due to the inclination of drum 25 flows under the influence of gravity into the individual tubes 26 as they successively pass through the lowermost point of the drum and thence through the tubes into the chamber at the opposite ends thereof. Thus, the chamber 27 provided at the inlet side of the drum 15 distributes the material fed to it from the hopper 14 uniformly into the individual tubes 16 and ensures that the charge is uniformly contacted with gases.

From the preheater 25, the flue gases flow in the known manner to a dust precipitating unit and from there discharged into the atmosphere. The dust that is removed is returned to the furnace in some suitable manner.

It will be appreciated that variations in design and construction of the apparatus of the invention as well as its method of operation, other than those suggested, are possible. Accordingly, the invention should not be deemed to be limited to the specific details shown and described but only by the appended claims.

What is claimed is:

1. Apparatus for preheating powdered material prior to introduction in a kiln which comprises a cyclone, means for feeding the material into the cyclone in parallel flow with hot flue gases from the kiln, means for discharging the material from the cyclone into the kiln, a chamber of large volume compared to said cyclone, having an ingress and egress end, means for feeding said material into said ingress end, means for discharging said material from said egress end into said cyclone feeding means, means for passing said flue gases from said cyclone into said egress end, means for discharging said flue gases from said chamber, and means in said chamber for throwing said material up into the stream of flue gas.

2. The apparatus of claim 1 wherein said chamber is constituted by a rotatably-supported drum which include means for channeling the flow of material and gas therethrough.

3. The apparatus of claim 2 wherein said channeling means comprises a plurality of pipes arranged in parallel within the drum.

4. The apparatus of claim 3 including means at the ingress end of the drum for distributing the material uniformly to said pipes.

References Cited in the file of this patent

UNITED STATES PATENTS

| 2,663,560 | Muller et al. | Dec. 22, 1953 |
| 2,802,280 | Sylvest | Aug. 13, 1957 |

FOREIGN PATENTS

| 378,555 | Great Britain | Aug. 18, 1932 |